(12) United States Patent
Nokkonen

(10) Patent No.: US 6,441,591 B2
(45) Date of Patent: Aug. 27, 2002

(54) LINEAR REGULATOR WITH CONDITIONAL SWITCHED MODE PREREGULATION

(75) Inventor: Erkki Nokkonen, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/811,058

(22) Filed: Mar. 16, 2001

(30) Foreign Application Priority Data

Mar. 17, 2000 (FI) .................................................. 000639

(51) Int. Cl.$^7$ .............................................. G05F 1/563
(52) U.S. Cl. ...................................... 323/266; 323/268
(58) Field of Search ................................. 323/266, 268

(56) References Cited

U.S. PATENT DOCUMENTS

| | | | |
|---|---|---|---|
| 5,216,351 A | 6/1993 | Shimoda | 323/224 |
| 5,309,082 A | 5/1994 | Payne | 323/270 |
| 5,563,498 A | 10/1996 | Candy | 323/224 |
| 5,592,072 A | 1/1997 | Brown | 323/268 |
| 5,682,093 A * | 10/1997 | Kivela | 323/273 |
| 5,773,966 A | 6/1998 | Steigerwald | 323/284 |
| 6,031,362 A | 2/2000 | Bradley | 323/269 |
| 6,150,798 A | 11/2000 | Ferry et al. | 323/273 |
| 6,169,391 B1 * | 1/2001 | Lei | 323/266 |
| 6,300,748 B1 * | 10/2001 | Miller | 323/266 |

FOREIGN PATENT DOCUMENTS

| | | |
|---|---|---|
| EP | 0699986 A3 | 3/1996 |
| EP | 0742509 A2 | 11/1996 |
| EP | 0903839 A1 | 3/1999 |
| GB | 2310570 | 8/1997 |
| GB | 2334600 | 8/1999 |

\* cited by examiner

*Primary Examiner*—Jeffrey Sterrett
(74) *Attorney, Agent, or Firm*—Perman & Green, LLP

(57) ABSTRACT

The invention regards a method and device for the current feed of a mobile communications device in a device comprising at least one dissipation-type voltage regulator (201), such as a linear regulator, in which the first voltage value of the regulator's input voltage (Vs, 211) is decreased with voltage-decreasing means (202–207, 212) to the second voltage value of the input voltage (Vs) compared to the used voltage (Vbat, 208), which is smaller than the first input voltage, to form the voltage regulator's (201) output voltage (Vout, 209).

15 Claims, 5 Drawing Sheets

LINEAR REGULATOR WITH CONDITIONAL SWITCHED MODE PREREGULATION

FIELD OF THE INVENTION

The present invention relates to a method and device for decreasing the voltage over a dissipation-type voltage regulator.

BACKGROUND OF THE TECHNIQUE

In electronic devices and especially, but not necessarily, in wireless mobile communications devices, there are several different operating voltages, which are switched on and off according to the necessary functions. A long-lasting and small rechargeable voltage source has been a preferred feature in mobile communications devices and portable electronic devices in general. As circuit design technology has continuously developed, it has become possible to manufacture devices with a lower operating voltage than before. The development has also made it possible to reduce the size and weight of rechargeable power sources such as mobile phone batteries without significantly reducing the operating time of the device.

Both high and low-current operating states appear in mobile communications devices, where in high-current operating states especially the transmitter part consumes the most notable portion of the voltage source's capacity. The power supply in a mobile communication device has traditionally been almost solely carried out with dissipation-type voltage regulators, also known as linear regulators, the only exception being some charge pump-type regulators meant for the RF part. In dissipation-type voltage regulators, the amount of current is regulated with a regulation circuit, which produces the required voltage dissipation between the input and output circuit (dV=Vin−Vout). The regulation circuit functions as the voltage-decreasing resistor R, which is connected in series with the load. The entire current load flows through it, creating power loss that is proportional to the square of the current load (Ploss=R*$I^2$). A dissipation-type voltage regulator is outlined below using a linear regulator as an example. As a voltage regulator, the linear regulator solution is in itself simple and easy to implement and works well in low-current operating states such as when a mobile communications device is in idle mode, but with large current it causes the linear regulator and the whole device to overheat and lose voltage source capacity for instance during a call.

FIG. 1 illustrates a linear regulator, port 11 of which is connected to the voltage source, port 12 is connected to the ground. The input voltage Vin is between ports 11 and 12 and the linear regulator's output voltage Vout is between ports 12 and 13. A voltage difference of at least dV must be left over the linear regulator to achieve the desired output voltage Vout. The value of the output voltage Vout is not dependent on how much Vin is larger than the minimum value (Vout+dV). Too small a voltage difference dV is also seen as a drop in the output voltage Vout, which may not be desired. The following example illustrates the growth of the linear regulator's power loss as the current grows. The example uses the situations and values, where Vin=3.6 V, Vout=1.8 V, load current in idle mode Ia=5 mA and in call mode Ib=100 mA. The power consumed by the linear regulator in idle mode is Pa=9 mW and if we move to the said call mode, the linear regulator's power consumption is now Pb=180 mW. The values illustrated above are only guidelines and only illustrate the fact that the current consumption in idle mode is usually a few milliamperes at most whereas in call mode the current consumption is several hundred milliamperes.

Several different solutions have been developed to minimise the energy consumption and thereby prolong the device's operating time. One example is regulating the transmission power during transmission, which improves the operating time. However, this solution does not remove the problem noticeable in connection with regulating battery voltage as overheating of the linear regulator and device and as power loss.

SUMMARY OF THE INVENTION

A method and device have now been invented to decrease the voltage over a dissipation-type voltage regulator.

According to the first aspect of the invention, there is implemented a regulator coupling (FIG. 2) comprising a dissipation-type voltage regulator, which has an input for receiving input voltage (Vs) and an output for providing output voltage (Vout), and means (Vbat) for providing the said input voltage to voltage regulator, characterised in that the regulator connection consists of a first and second operating mode, means for providing the said input voltage with a first voltage value in the said first operating mode and means for providing the said input voltage with a second voltage value in the said second operating mode, in which the second voltage value is smaller than the said first voltage value.

According to a second aspect of the invention, there is implemented a method for using a dissipation-type voltage regulator, in which an input voltage (Vs) is formed for the voltage regulator and output voltage (Vout) is received from the voltage regulator, characterised in that the method uses the voltage regulator in a first and a second operating mode, a first voltage value is formed for the said input voltage (Vs) in the first operating mode, and a second voltage value is formed for the said input voltage (Vs) in the second operating mode, in which the second voltage value is smaller than the said first voltage value.

According to a third aspect of the invention, there is implemented an electronic device comprising at least one dissipation-type voltage regulator, which has an input for receiving input voltage (Vs) and an output for providing output voltage (Vout), and means for providing the said input voltage to voltage regulator, characterised in that the regulator coupling comprises a first and second operating mode, means for providing the said input voltage with a first voltage value in the said first operating mode and means for providing the said input voltage with a second voltage value in the said second operating mode, in which the second voltage value is smaller than the said first voltage value. The electronic device is preferably a mobile communications device.

The invention uses, depending on the load level of the dissipation-type voltage regulator, the best possible regulation method by combining the best assets of switched-mode-type and dissipation-type voltage regulators. When the load current is low, the linear regulator can be used on its own, because the heat and capacity losses are low even though the voltage over the linear regulator is high. When the load current is high, for instance during a call, a switched-mode-type voltage regulator is used to pre-regulate the voltage to such a level that the heat losses in the linear regulator after it are kept low. The output voltage of the linear regulator is always the same regardless of which regulation method is used. The switched-mode-type voltage regulator works as a power transformer, i.e. it does not lose as much battery capacity in heat losses. This is especially true with large load currents, in which case the efficiency of the switched-mode-type voltage regulator is at its best. With small current, on the other hand, the current consumption resulting from the connection loss of the switched-mode-type voltage regulator reduces the efficiency and its use is no longer justified.

With the invention, a simple means of reducing the voltage over the dissipation-type voltage regulator is achieved when using large load currents. The overheating and power loss of the voltage regulator in question is also reduced from what it was previously. Use of the method allows efficient utilisation of the voltage source's capacity, due to which the same capacity grants a longer operating time than before. The invention also makes it possible to always use the best regulation method in various situations, because the transition from one mode to another does not cause a break in the linear regulator's input voltage. Therefore, e.g. the transition from idle mode to call mode and vice versa in a mobile communications device can be performed smoothly.

BRIEF DESCRIPTION OF THE DRAWINGS

In the following, the invention will be explained in detail by referring to the enclosed drawings, in which:

FIG. 1 illustrated the operation of a known linear regulator above. The invention is described below mainly with reference to FIGS. 2–5.

DETAILED DESCRIPTION

Figure 1:
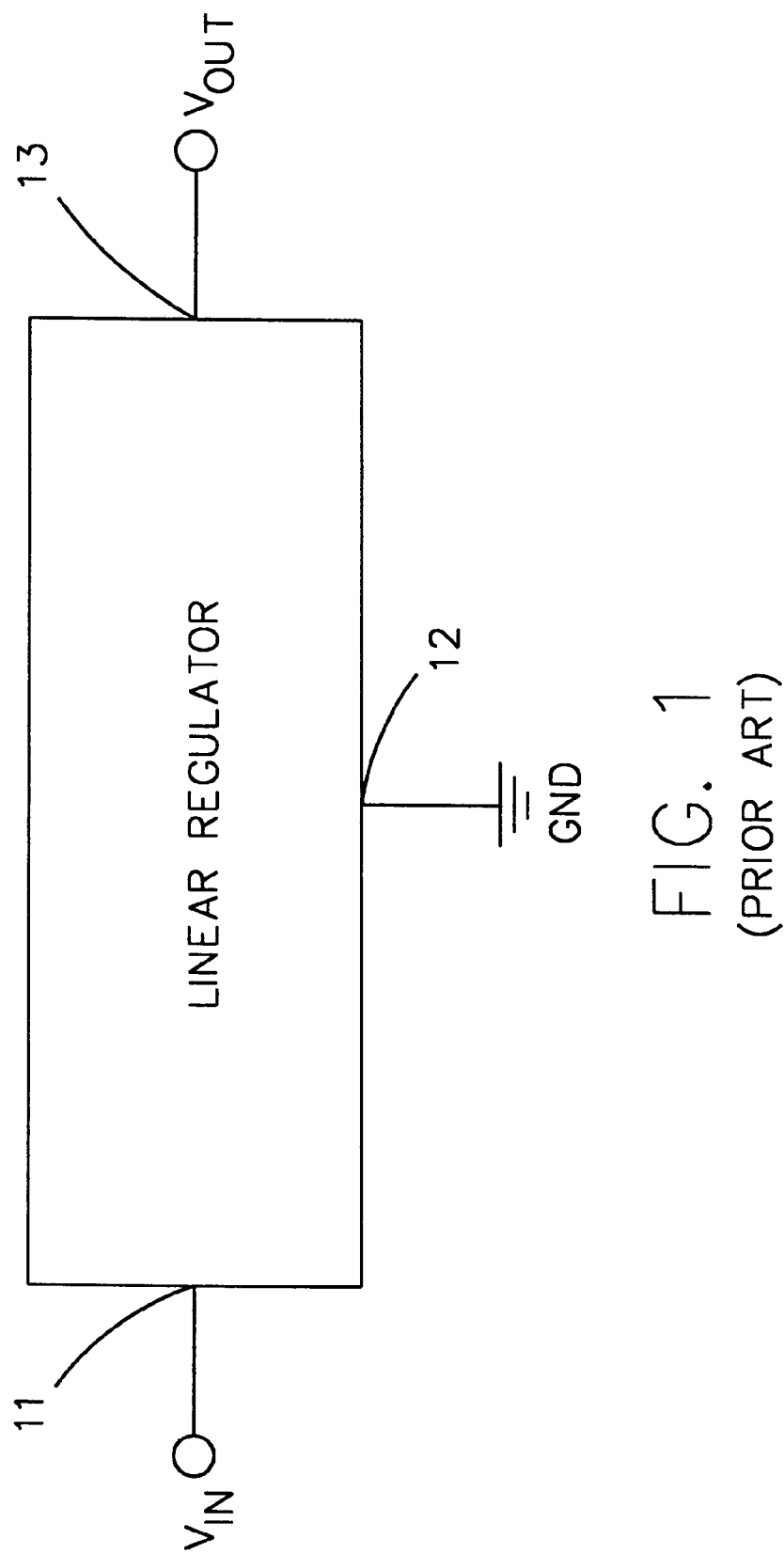
FIG. 1 illustrates the operation of a voltage regulator.
Figure 2:
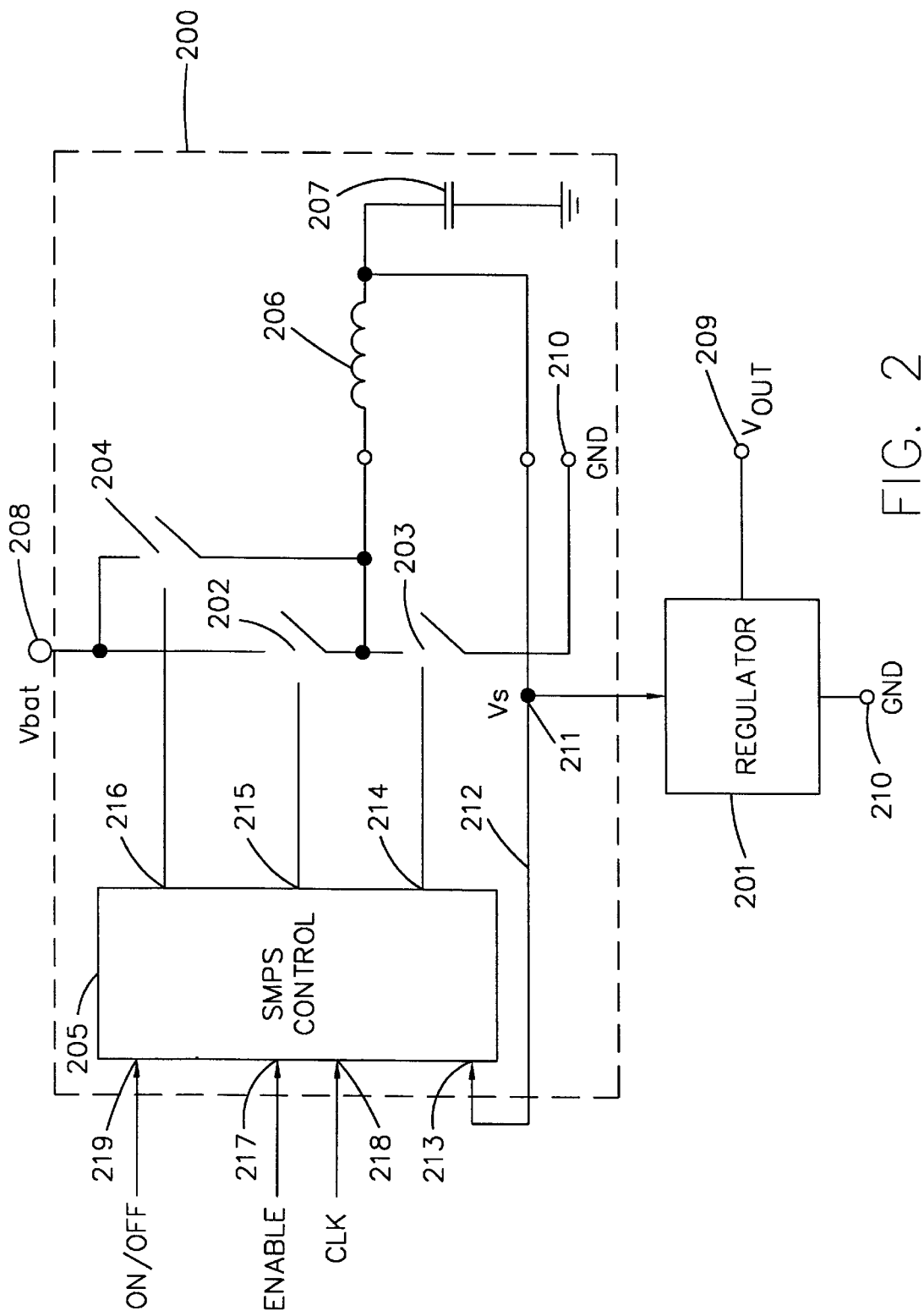
FIG. 2 illustrates a device according to the invention in the delivery of current of a mobile communications device as a block chart.

FIG. 2 illustrates a device according to an embodiment of the invention comprising a linear regulator 201, switches 202, 203, 204, which are preferably implemented as transistors, a switched-mode power supply control device 205 (SMPS Control) for controlling the said switches (202–204), coil 206 and capacitor 207 for filtering the switched-mode power supply's voltage, voltage supply output 208, regulated voltage output 209 and earth potential 210.

The output port of switch 203 is connected to earth potential 210, the control port is connected to the output 214 of the control device 205 and the input port is connected to the output port of switch 202. The output port of switch 202 is further connected in parallel to the output port of switch 204, the control port is connected to the output 215 of the control device 205 and the input port is connected in parallel with the input port of switch 204. The output port of switch 204 is further connected to the first end of the coil 206, the control port is connected to the output 216 of the control device 205 and the input port is further connected to the voltage supply's output 208. The other end of coil 206 is connected in parallel with the first end of capacitor 207 and is further connected via the input 211 of the linear regulator 201 with a return coupling 212 to the input 213 of the control device 205. The other end of the capacitor is connected to the earth potential 210. The first output of the linear regulator 201 is connected to output 209 and the other output is connected to the earth potential 210. The control device 205 further comprises inputs for switching the equipment on and off 219 (ON/OFF), switched-mode-enabling signal 217 (ENABLE) and clock signals 218 (CLK).

Figure 3:
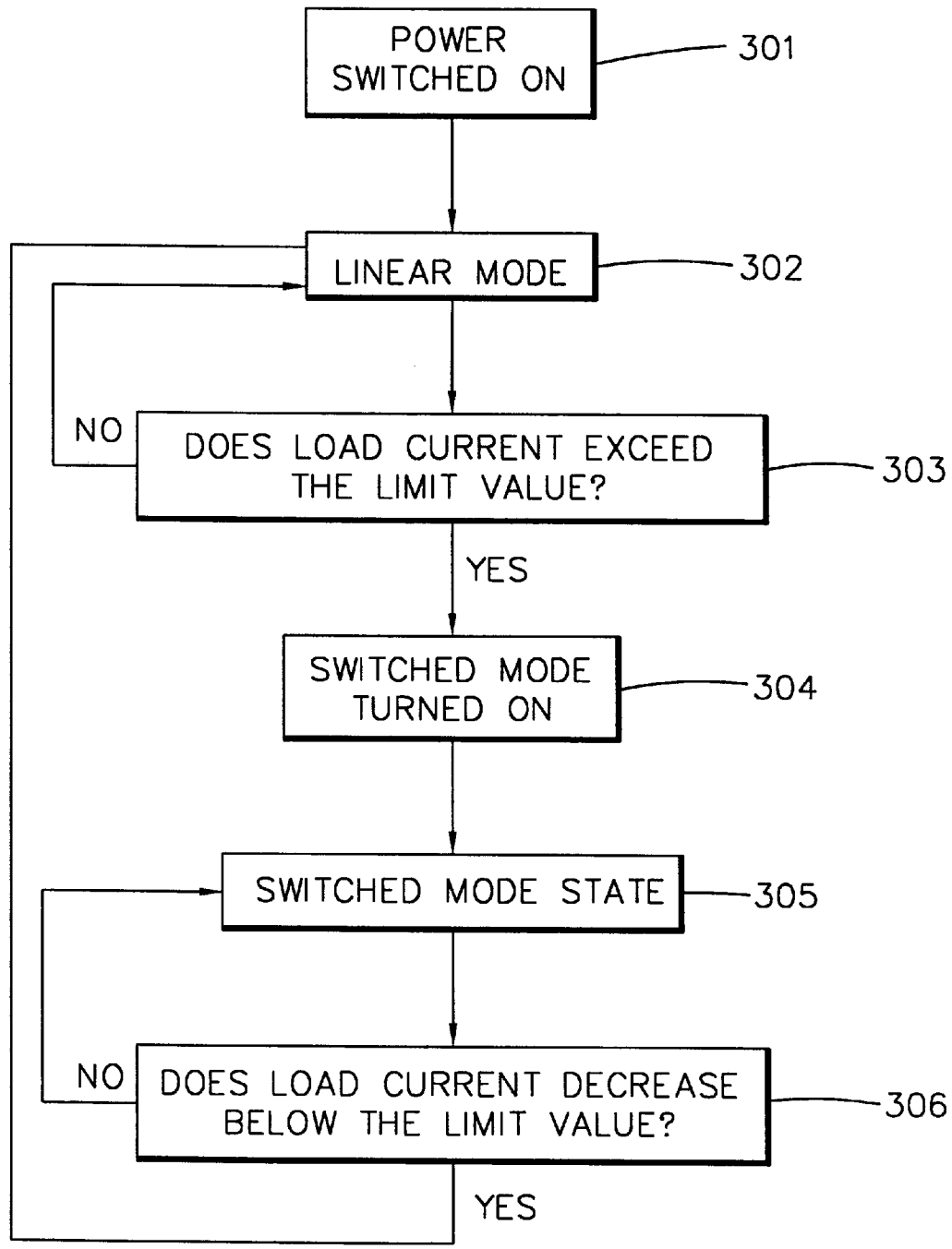
FIG. 3 illustrates a flow chart of the progression of the various functional phases.

FIG. 3 presents a flow chart illustrating one preferred embodiment of the method according to the invention, in which the current is first switched on to the equipment after which the process moves to the linear mode.

Activation of the system takes place by switching the current on, upon which the control device 205 receives a signal to port 219 (step 301), upon which it closes switch 204. The power now flows through switch 204 and coil 206, charging capacitor 207 to the voltage supply Vbat. After this, switch 202 is also closed, after which switch 204 is opened and the process moves to linear mode (step 302). The resistance of switch 204 is greater than that of switches 202 and 203 and it is meant for the decelerated initial charging of capacitor 207, because the load current runs through switch 204. The linear mode can also be implemented so that only switch 204 is used during that mode, in which case switch 202 is closed and switch 204 is not opened until the initiation stage 304 of the switched-mode state. The output voltage is now received from output 209 (Vout). The linear mode can be used whenever the current consumption is low (amounting to a few milliamperes), e.g. when the mobile communications device is in idle mode. The amount of load current can be monitored during the linear phase continuously at output 209 or alternatively the point at which a procedure that increases the load current, e.g. a call, is initiated (step 303) can be monitored.

If the load current at the output 209 exceeds a certain limit, the switched-mode control device 205 is activated (step 304) and the process moves to the switched-mode stage (step 305). For example, a typical situation is that a mobile communications device in idle mode detects that a call is incoming. During the call, the device's current consumption typically amounts to hundreds of milliamperes. The control of switches 202 and 203 takes place by program with the help of the activation (ENABLE) and clock (CLK) signals.

When turned on, the switched-mode control device 205 opens the switches 202 and 204 unless they are already open. Switches 202 and 203 remain open until the load current has discharged some of the charge in capacitor 207 and the input voltage 211 (Vs) of the linear regulator has dropped to near (dV) the level of the output voltage 209 (Vout).

A switched-mode power supply is coupled back 212 to the input 213 of the control device 205 to monitor the level of the voltage 211 (Vs). Upon the opening of switch 202, the control device 205 detects the decrease in voltage 211 (Vs) and starts to operate. With the help of switches 202 and 203, the control device 205 forms a square wave voltage pulse, in which for the first half-period switch 202 closes while switch 203 is open and for the second half-period switch 202 opens while closing switch 203, to avoid stopping of the current flow. The current I therefore flows through switch 202 for the first half-period and through switch 203 for the second half-period. The control device 205 continuously monitors the amount of voltage Vs during the switched-mode stage. If necessary, the control device 205 changes the controlled pulse ratio of switches 202 and 203 to maintain the voltage Vs at a specific value.

Without the switched-mode power supply, the heat losses of the linear regulator would rise significantly as the load current I grows. Now, even if the load current I is high, there is not very much heat loss, because the voltage loss is small. In addition to the switched-mode output voltage 211 (Vs), the amount of the above-mentioned voltage loss is affected by the voltage tolerances of both it and the linear regulator.

The state of procedures that increase the amount of load current or the load power are continuously monitored (step 306) during the switched-mode state. If the load current at output 209 falls beneath a certain level or the procedure that increased the load current ends, there is no point in using the switched-mode power supply in favour of the linear regulator on its own, so the process moves to step 302. Such a situation arises e.g. when a call ends and the process moves to idle mode. The switched-mode power supply is stopped so that switch 202 is left closed and switch 203 is left open. The battery voltage (Vbat) can now resume charging the capacitor 207 and the linear regulator's input voltage 211 (Vs) rises to the level of the battery voltage (Vbat). The power and heat losses are however kept low due to the fact that the current I is now at a low level.

The following example illustrates the operation of the regulation coupling with reference to FIG. 2. The presented voltage levels are examples, other values can also be used on the understanding that the switched-mode power supply's output voltage (Vs) is smaller than its input voltage (Vbat) and that the linear regulator's output voltage (Vout) is smaller than the switched-mode power supply's output (Vs).

The battery voltage Vbat is presumed to be 3.6 V, the output of the whole system Vout is 1.8 V and the output voltage of the actual switched-mode power supply 211 (Vs) is 2.3 V while the switched-mode power-supply is operating. In addition, the values used for the load current are previously presented values in idle mode Ia=5 mA and in call mode Ib=100 mA. When the system is activated into idle mode, switch 204 is closed, upon which the power flows through coil 206 and charges the capacitor 207 to the battery voltage (Vbat) 3.6 V. The system now uses only the linear regulator, the power consumption of which in idle mode is as previously stated Pa=9 mW. When a call is received, the process moves to switched-mode state, upon which switch 202 is opened and switch 204 is opened unless this was not already previously done. Switch 202 is now closed, upon which the load current discharges the capacitor's charge and the feedback 212 of control device 205 at input 213 monitors the decreasing voltage. When the voltage 211 (Vs) drops near to 2.3 V, switch 202 closes and the pulse voltage formed by the switches (202, 203) is now at the level of the voltage supply's output 208 (first half-period). The control device 205 then opens switch 202 while closing switch 203, upon which the said pulse voltage is at the level of the earth potential 210 (second half-period). The current therefore flows through switch 202 for the first half-period and through switch 203 for the second half-period. The voltage over the linear regulator in call mode is 0.5 V, so the power consumption is now Pb=50 mW. It was previously stated that the power consumption in call mode with the corresponding load current is Pb=180 mW when using the linear regulator alone.

Figure 4:
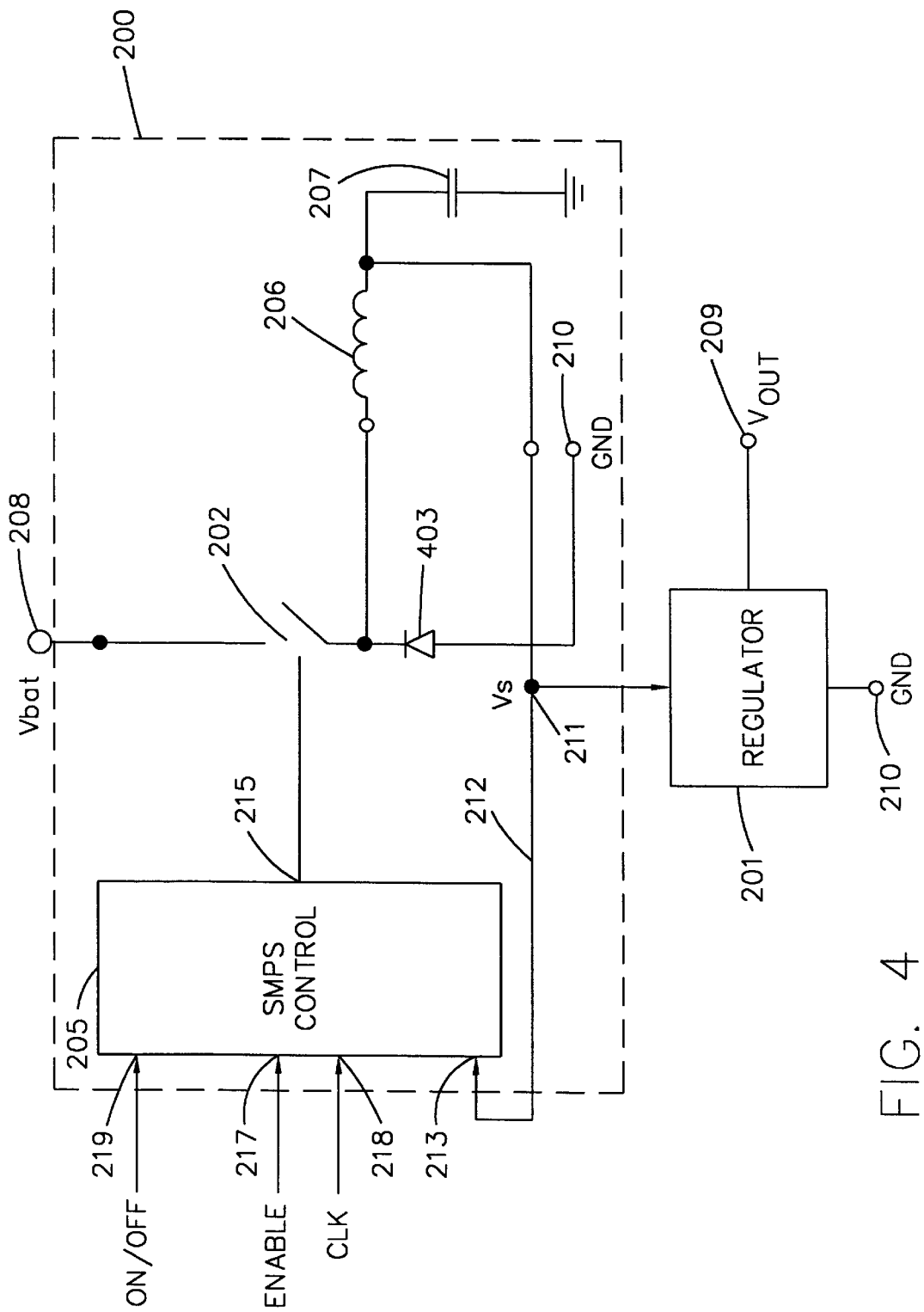
FIG. 4 illustrates a preferred form of implementation for the invention.

FIG. 4 illustrates a preferred embodiment of the invention, in which the transistor switch 203 corresponding to FIG. 2 is replaced with a diode 403. The current now flows through switch 202 for the first half-period and through diode 403 for the second half-period. The other of the switches 204 (or 202) can also be left entirely out of the coupling and use only the combination of switch 202 (or 204) and diode 403 or the combination of switches 202 (or 204) and 203.

Figure 5:
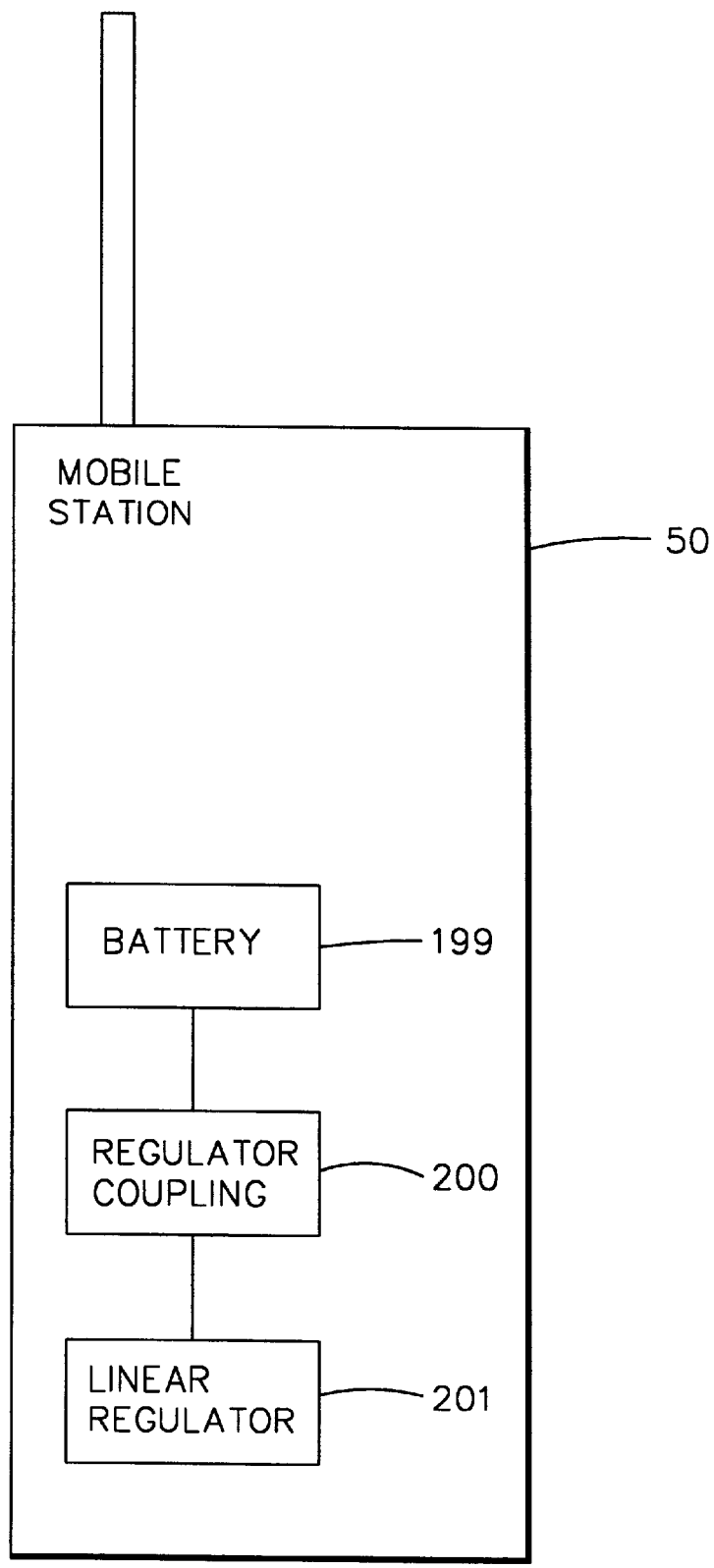
FIG. 5 illustrates a mobile communications device comprising at least one linear regulator and a device for decreasing the input voltage of the said linear regulator.

FIG. 5 illustrates a mobile communications device 50 comprising a voltage source 199, at least one linear regulator 201 and a device 200 for decreasing the said linear regulator's input voltage Vs to provide the linear regulator's output voltage Vout.

The regulator coupling according to the invention is not limited solely to use in a mobile communications device; it can also be used in any electronic device, the power consumption and warming up of which can be reduced with the method and device according to the invention. The use of dissipation-type voltage regulators is also not limited to one; instead several dissipation-type voltage regulators, such as linear regulators, can be connected in parallel to the switched-mode power supply. The regulator coupling can be implemented as an integrated circuit except for the coil 206 and capacitor 207. The clock and control signals 217–219 and the feedback 213 can be produced in the same integrated circuit or they can come from outside the said circuit. The diode used to replace switch 203 can also be implemented as integrated into the circuit. Switches 202–204 (or 202 and 203) can also be separate and the control device 205 can be separate as its own circuit. The linear regulator 201 can also be integrated to the control device 205 or it can be a separate component.

This paper presents the implementation and embodiments of the invention with the help of examples. A person skilled in the art will appreciate that the present invention is not restricted to details of the embodiments presented above and that the invention can also be implemented in another form without deviating from the characteristics of the invention. The presented embodiments should be regarded as illustrative but not restricting. Thus, the possibilities of implementing and using the invention are only restricted by the enclosed claims, and the various options of implementing the invention as determined by the claims, including the equivalent implementations, also belong to the scope of the invention.

What is claimed is:

1. A regulator coupling comprising:
   a dissipation-type voltage regulator, which has an input for receiving input voltage (Vs) and an output for providing output voltage (Vout), and
   means (Vbat) for providing said input voltage to the voltage regulator, wherein the regulator coupling comprises:
   a first and second operating mode,
   means for providing said input voltage with a first voltage value in said first operating mode, and
   means for providing said input voltage with a second voltage value in said second operating mode, in which the second voltage value is smaller than said first voltage value.

2. A regulator coupling according to claim 1, wherein said voltage regulator is arranged to provide an equal voltage to the output as said output voltage (Vout) in said first and second operating mode.

3. A regulator coupling according to claim 1, wherein it comprises regulator means for forming said second voltage value by regulating from said first voltage value.

4. A regulator coupling according to claim 3, wherein said regulator means comprises:
   a feedback for monitoring the voltage level of the input voltage (Vs),
   a control device the switches, wherein said control device further comprises an output for controlling the switches, an input for receiving a control signal and an input for receiving a feed back voltage through said feedback, and said switches are arranged to form a pulse-form voltage from a used voltage supply's voltage (Vbat), and a coil and capacitor for filtering the formed pulse-form voltage as the voltage regulator's input voltage (Vs).

5. A regulator coupling according to claim 1, wherein it is used in a mobile communications device and that said first operating mode is the idle mode of the mobile communications device and said second operating mode is the call mode of the mobile communications device.

6. A method for using a dissipation-type voltage regulator, in which an input voltage (Vs) is formed to the voltage regulator and an output voltage (Vout) is gained from voltage regulator, wherein the method comprises the steps of:

using the voltage regulator in a first and a second operating mode, forming a first voltage value for said input voltage (Vs) in the first operating mode, and forming a second voltage value for said input voltage (Vs) in the second operating mode, in which the second voltage value is smaller than said first voltage value.

7. A method according to claim 6, wherein said first and said second operating mode provide an equal output voltage as said voltage regulator's output voltage (Vout).

8. A method according to claim 6, wherein when the load current flowing through said voltage regulator exceeds a predetermined limit value, the process moves from the first operating mode to the second operating mode.

9. A method according to claim 6, wherein when the load current flowing through said voltage regulator decreases below a predetermined limit value, the process moves from the second operating mode to the first operating mode.

10. A method according to claim 6, wherein said first voltage value in said first operating mode is formed from the voltage of the voltage supply (Vbat) to form said voltage regulator's output voltage (Vout).

11. A method according to claim 6, wherein said second voltage value in said second operating mode is regulated from said first voltage value to form the output voltage of the voltage regulator (Vout).

12. A method according to claim 11, wherein in said second operating mode a pulse voltage is formed from the voltage supply's voltage (Vbat), and said pulse voltage is filtered as the second voltage value of said voltage regulator's input voltage (Vs).

13. An electronic device comprising:

at least one dissipation-type voltage regulator, which has an input for receiving input voltage (Vs) and an output for providing output voltage (Vout), and means for providing said input voltage to the voltage regulator, wherein the device comprises:

a first and second operating mode, means for providing said input voltage with a first voltage value in said first operating mode, and means for providing said input voltage with a second voltage value in said second operating mode, in which the second voltage value is smaller than said first voltage value.

14. A device according to claim 13, wherein said device is a mobile communications device.

15. A device according to claim 13, wherein said voltage regulator is a linear regulator.

* * * * *